United States Patent
Li et al.

(10) Patent No.: US 10,628,304 B2
(45) Date of Patent: Apr. 21, 2020

(54) GARBAGE COLLECTION IN AN IN-MEMORY REPLICATION SYSTEM

(75) Inventors: Li Li, Beijing (CN); Ju Wei Shi, Beijing (CN); Rui Xiong Tian, Beijing (CN); Yi Xin Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1515 days.

(21) Appl. No.: 13/106,751

(22) Filed: May 12, 2011

(65) Prior Publication Data

US 2011/0296132 A1 Dec. 1, 2011

(30) Foreign Application Priority Data

May 31, 2010 (CN) .......................... 2010 1 0192518

(51) Int. Cl.
*G06F 12/02* (2006.01)
(52) U.S. Cl.
CPC ................ *G06F 12/0253* (2013.01)
(58) Field of Classification Search
USPC ......................................................... 707/813
See application file for complete search history.

(56) References Cited

U.S. PATENT DOCUMENTS

| | | | |
|---|---|---|---|
| 5,819,299 A | 6/1998 | Bejar | |
| 7,290,019 B2 | 10/2007 | Bjorner et al. | |
| 2008/0250213 A1* | 10/2008 | Holt | 711/159 |
| 2009/0112953 A1* | 4/2009 | Barsness et al. | 707/206 |
| 2009/0119353 A1* | 5/2009 | Oh et al. | 707/205 |
| 2009/0248766 A1 | 10/2009 | Garthwaite et al. | |
| 2010/0114999 A1 | 5/2010 | Qi | |
| 2010/0325351 A1* | 12/2010 | Bennett | G06F 12/0246 711/103 |

FOREIGN PATENT DOCUMENTS

CN 1808394 A 7/2006

* cited by examiner

*Primary Examiner* — Amresh Singh
(74) *Attorney, Agent, or Firm* — Steven L. Nichols; Fabian VanCott

(57) ABSTRACT

Garbage collection in a first node server of an in-memory replication system includes: in response to a garbage collection trigger in the first node server, determining whether identification information for a data object eligible for garbage collection in the first node server has been received by the first node server from at least a second node server in the in-memory replication system; and if the identification information has been received from at least the second node server, performing garbage collection on the data object with the first node server.

17 Claims, 5 Drawing Sheets

GARBAGE COLLECTION IN AN IN-MEMORY REPLICATION SYSTEM

CROSS-REFERENCE TO RELATED APPLICATIONS

The present application claims priority under 35 U.S.C. § 119(a) to Chinese Patent Application No. 201010192518.1, which was filed on May 31, 2010.

BACKGROUND

Aspects of the present invention relate to garbage collection in computer programming. In particular, the present invention relates to providing garbage collection in an in-memory replication system.

In order to provide high availability and failover of the memory, an application server may provide an in-memory replication mechanism. The basic function of in-memory replication is to back up multiple copies of data stored by a first node server memory in other node servers, wherein the current data in operation becomes primary data, and the backup copies of data become replica data. When the primary data is temporarily damaged due to some reason, e.g. the currently serving server is dead, the replica data will be used as the primary data, and the task of the primary server can be taken over in real time.

BRIEF SUMMARY

Garbage collection in a first node server of an in-memory replication system includes: in response to a garbage collection trigger in the first node server, determining whether identification information for a data object eligible for garbage collection in the first node server has been received by the first node server from at least a second node server in the in-memory replication system; and if the identification information has been received from at least the second node server, performing garbage collection on the data object with the first node server.

A system for garbage collection in a first node server of an in-memory replication includes a processor and at least one memory communicatively coupled to the processor. The memory includes executable code that, when executed by the processor, causes the processor to: determine whether any external node server has indicated that a data object stored by the at least one memory is eligible for garbage collection; and in response to determining that an external node server has indicated that a data object stored by the at least one memory is eligible for garbage collection, perform garbage collection on the data object.

A computer program product for processing a query of a database includes a tangible computer-readable storage medium having computer-readable program code embodied therewith. The computer-readable program code includes: computer-readable program code configured to, in response to a garbage collection trigger in the first node server, determine whether identification information for a data object eligible for garbage collection in the first node server has been received by the first node server from at least a second node server in the in-memory replication system; and computer-readable program code configured to, if the identification information has been received from at least the second node server, perform garbage collection on the data object with the first node server.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
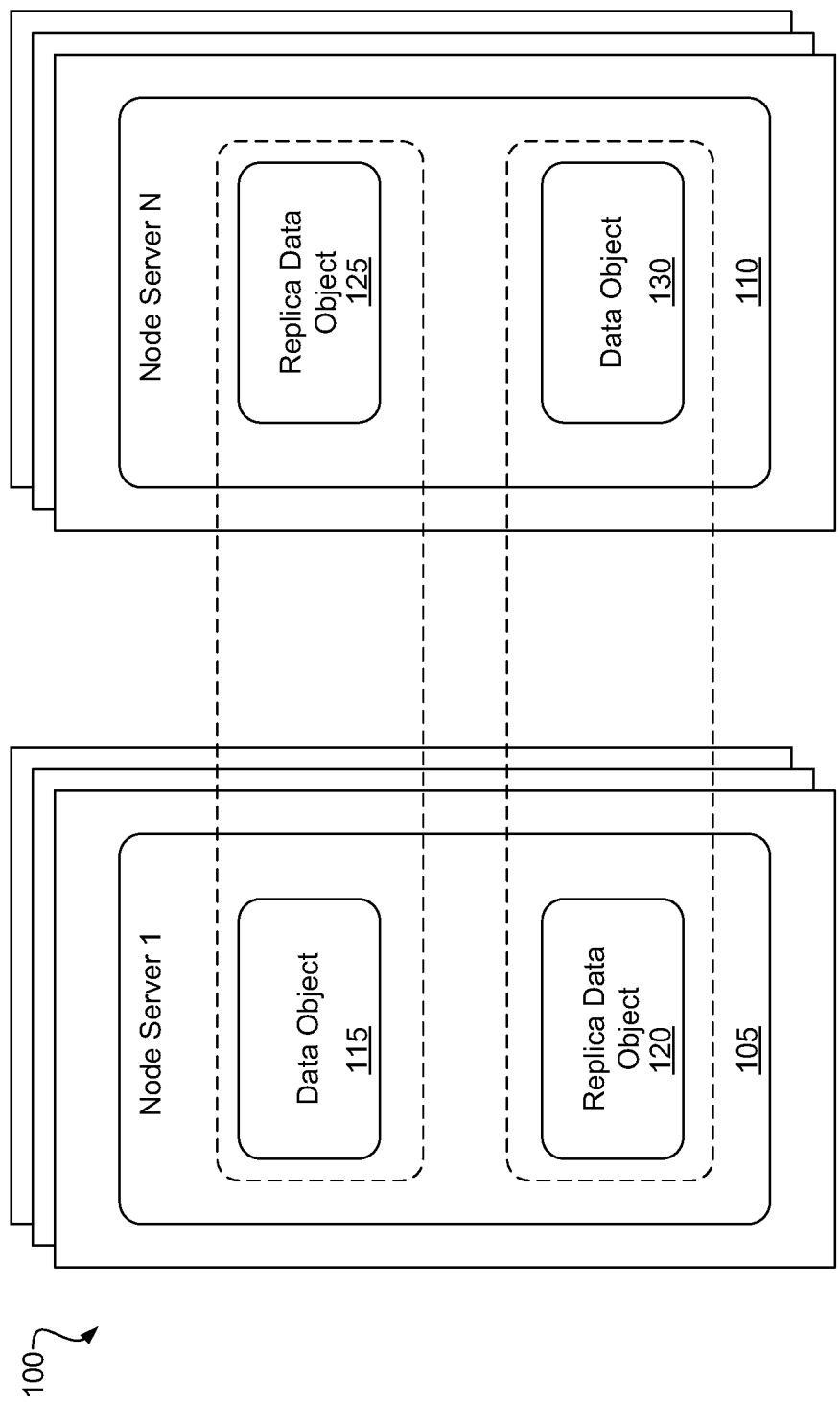
FIG. 1 is a schematic diagram showing an in-memory replication system according to one example of principles described herein.

The present specification discloses systems, methods, and computer program products for handling queries. In particular, the systems, methods, and computer program products disclosed in the present specification may provide an auto-suggest function for complex query construction.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As used in the present specification, the term "garbage collection" means the removal of data objects that are no longer used by applications and reclamation of the memory occupied by the removed data objects.

In a Java Virtual Machine (JVM), the garbage collection mechanism may include a Mark-Copy and/or Mark-Sweep operation. The task of the mark operation is to traverse all the data objects in a heap from a root node and to mark all the data objects found to be alive until all the data objects are traversed, wherein unmarked data objects are garbage. In Mark-Copy, all the live data objects are copied to another new heap (dynamic memory space), those data objects not copied are garbage, and the original memory space is collected and released as a whole.

In Mark-Sweep, the unmarked data objects are directly removed and collected. However, since the mark operation must traverse the whole heap, a lot of time and computing resources are required; however, when the mark operation for garbage collection is performed in the in-memory replication system, since the operating environments (e.g. JVM) of various node servers perform garbage collection independently of each other, it is required to perform the mark operation on a number of pieces of data independently of each other, which greatly wastes CPU computing resources of the various node servers, and particularly in case of heavy load of a node server, even directly results in overload of the node server.

FIG. 1 is a schematic diagram showing an in-memory replication system (100) according to certain examples of the principles of the present specification. As shown in the figure, the in-memory replication system comprises a plurality of node servers (105, 110). Data to be stored in the current node server (105) is split through the in-memory replication mechanism into a plurality pieces of data each comprising a plurality of data objects (115, 130) each being replicated into k corresponding replica data objects (120, 125) to be distributed to one or more of the other node servers (105, 110), and if a data object (115, 130) in the current node server (105, 110) is unavailable, replica data objects (120, 125) in other node servers (105, 110) will be used to serve data access in real time.

Figure 2:
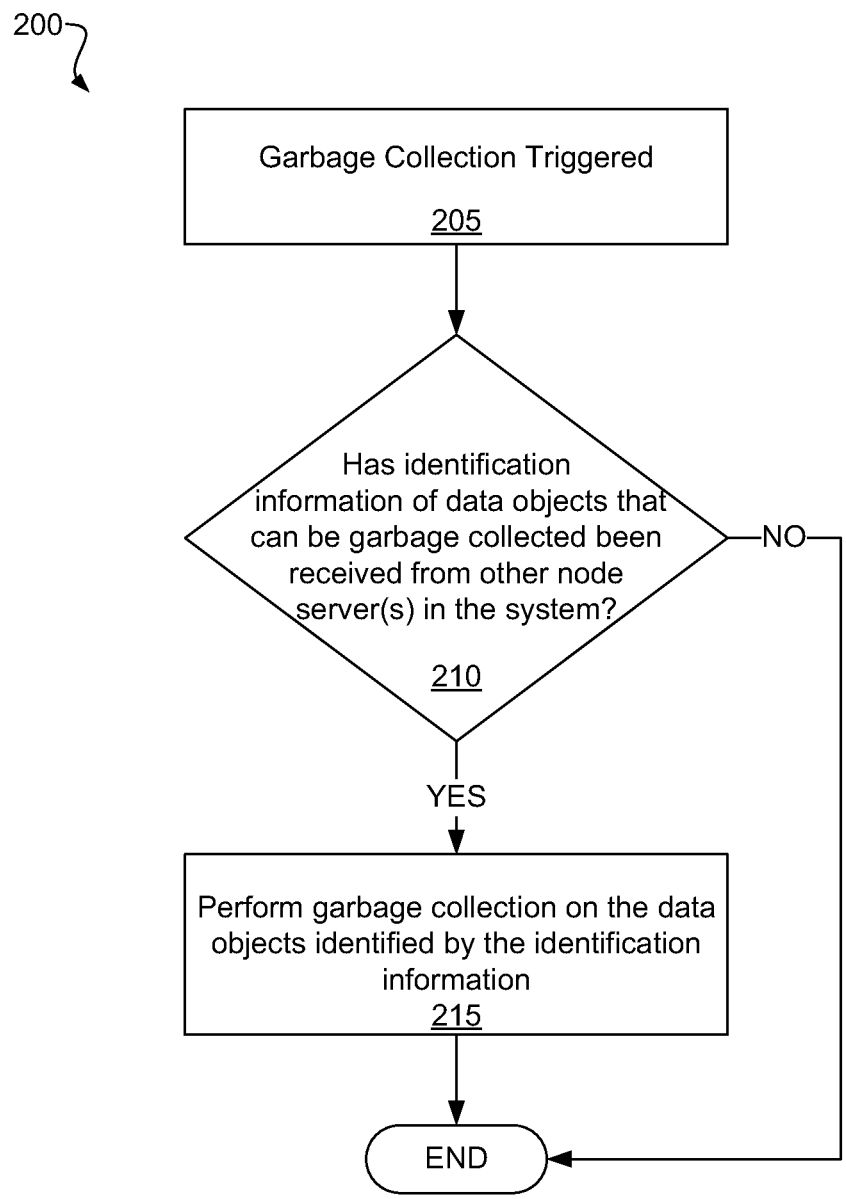
FIG. 2 shows a flowchart diagram of an illustrative method of garbage collection in a node server of an in-memory replication system, according to one example of principles described herein.

FIG. 2 shows a method (200) for garbage collection in node servers of an in-memory replication system according to certain examples. In the method (200), in response to garbage collection in a node server being triggered (block 205), a determination is made (block 210) of whether there exists identification information received from other node servers in the in-memory replication system of data objects that can be garbage-collected. If so (block 210, YES), garbage collection is performed (block 215) on the data objects identified by the identification information received from other node servers in the in-memory replication system.

Figure 3:
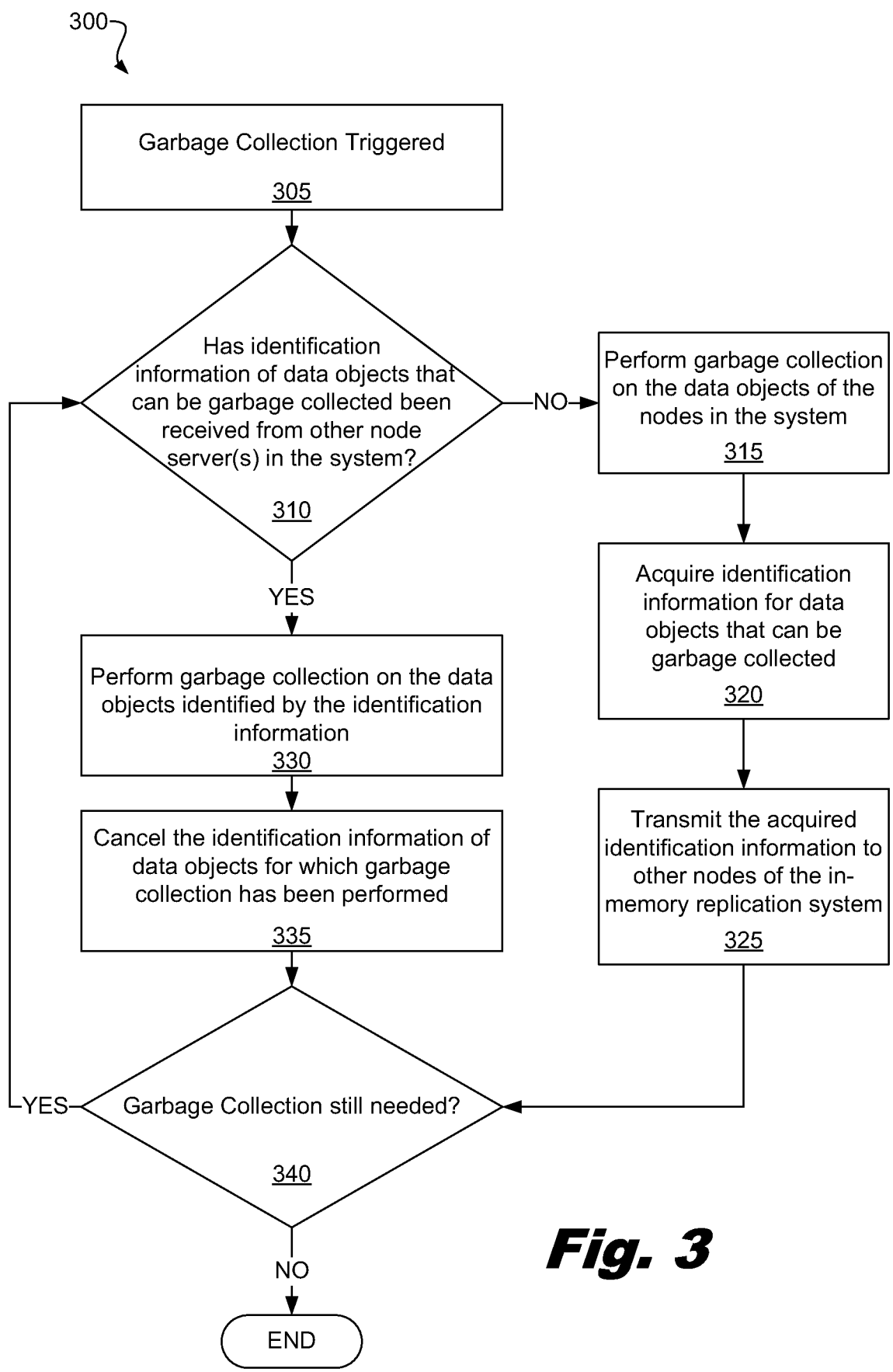
FIG. 3 is a flowchart diagram of an illustrative method of garbage collection in a node servers of an in-memory replication system, according to one example of principles described herein.

FIG. 3 is a flow chart showing a more detailed illustrative method (300) of garbage collection in node servers of an in-memory replication system according to one example of principles of the present specification.

In block 305, garbage collection in a node server of the in-memory replication system is triggered. By taking JVM (Java Virtual Machine) as an example, if an idle memory space managed by a JVM is too small or a continuously idle memory space is too small such that JVM cannot allocate a memory space for the objects from the heap, JVM will issue a notification indicating memory allocation error, thereby activating the garbage collector to perform garbage collection.

In block 310, a determination is made as to whether identification information of data objects that can be garbage-collected has been received from other node servers.

If such identification information does not exist (block 310, NO), then in block 315, the data objects of the current node server of the in-memory replication system are garbage-collected by using the existing garbage collection mechanism. Specifically, since the various node servers perform garbage collection independently of each other, in the process of garbage collection on the data objects of the node server by using the existing garbage collection mechanism such as Mark-Copy and Mark-Sweep, the node servers respectively monitor the mark operation of the data objects thereon. The task of the mark operation is to traverse all the data objects dynamically allocated in a heap from a root node of an application program by using mutual reference relations, and to mark all the data objects found to be alive by "1" for example until all the data objects are traversed, wherein unmarked data objects are the data object that can be garbage-collected.

In block 320, the identification information of the data objects that can be garbage-collected in the process of garbage collection is acquired.

According to certain examples, a data object identification table may be created in each node server of the in-memory replication system, in which identification information of all data objects in the in-memory replication system is recorded, and the various node servers are updated through the synchronization mechanism in the prior art to thereby maintain data consistency. The identification information may be address information of the data objects in the primary node server and backup node servers, or may be a global unique identification of the data object in the in-memory replication system. In case of the global unique identification, it is needed to further crate a memory address mapping table in the various node servers, in which mapping relations between the global unique identification and corresponding memory addresses of the data object are recorded.

According to certain examples, the node server that performs garbage collection may search the data object identification table for identification information of the data objects that can be garbage-collected in other node servers. According to another example, one of the node servers may be selected as a host node server for maintaining the data object identification table, and if the identification information of the data objects in other node servers changes, the host node server will be notified in time, the host node server correspondingly updates the data object identification table, the node server that performs garbage collection transmits the identification information of the data objects that can be garbage-collected to the host node server, and the host node server searches the data object identification table for the identification information of those data objects that can be garbage-collected in other node servers.

In block 325, the identification information of the data objects that can be garbage-collected is transmitted to other node servers that contain the data objects that can be garbage-collected, that is, other node servers that contain data objects that are replications of the data objects that can be garbage-collected. Thereafter, the process terminates if no further garbage collection is determined needed.

If it is determined that identification information received from other node servers of data objects that can be garbage-collected exists (block 310, YES), in block 330, the data objects that are replications of the data objects that can be garbage-collected are garbage-collected by using the identification information received from the other node servers. The process advances to block 335 where the identification information, received from the other node servers of the data objects that can be and have been garbage-collected, is cancelled and the process ends if no further garbage collection is determined needed. If, after the space is released, the idle memory space still is too small or the continuously idle memory space is still insufficient, garbage collection may be continuously triggered (block 340, YES), and the process returns to block 310.

According to certain examples, a process of garbage collection on the data objects of the node server by using Mark-Sweep is described. Mark-Sweep is divided into three phases: mark phase, sweep phase and compression phase. In response to the garbage collection being triggered, the method according to certain examples can remove the operation in the mark phase and directly utilizes the identification information of the data objects that can be garbage-collected, received from other node servers for the sweep operation. According to certain examples, the identification information of the data objects that can be garbage-collected may be memory address information of the data objects that can be collected, and the garbage collector directly releases the memory space of the memory addresses of the data objects that can be collected. According to another example, the identification information of the data objects that can be garbage-collected may be the global unique identification of the data objects that can be collected in the primary node server and backup node servers, then a data object identification table is created in the other node servers, in which mapping relations between the global unique identification of the data objects contained in the node server and the memory addresses of the data objects are recorded, and the memory address mapping table is searched for the memory addresses of the data objects corresponding to the global unique identification. Further, the garbage collector releases the memory space of the memory addresses of all the data objects that can be collected, and finally in the compression phase, it places the discretely and disorderly distributed objects at continuous addresses in the memory.

According to another example, a process for garbage collection on the data objects of the node server by using Mark-Copy is described. JVM divides the memory space managed thereby in two, and when used memory space has been reduced by half, the garbage collector is activated for garbage collection. The method according to the present example does not necessarily perform the mark operation on the data objects, but directly utilizes the identification information of the data objects that can be garbage-collected, received from other node servers for copy operation. According to certain examples, the identification information of the data objects that can be garbage-collected may be memory address information. In these examples, the garbage collector copies all alive objects at memory addresses other than those of the data objects that can be collected to the first half of unused memory space and continues to allocate memory in the first half of the space. The second half of the space is converted into an idle space as a target space of the next garbage collection. According to another example, the identification information of the data objects that can be garbage-collected may be global unique identification of the data objects that can be collected in the host node server and the backup node servers. Accordingly, the memory address mapping table maintained by the other node servers is searched for the memory addresses of the data objects corresponding to the global unique identification. The garbage collector copies all of the live data objects (e.g., data objects in use) at memory addresses other than those of the data objects that can be collected to the second half of unused memory space.

Figure 4:
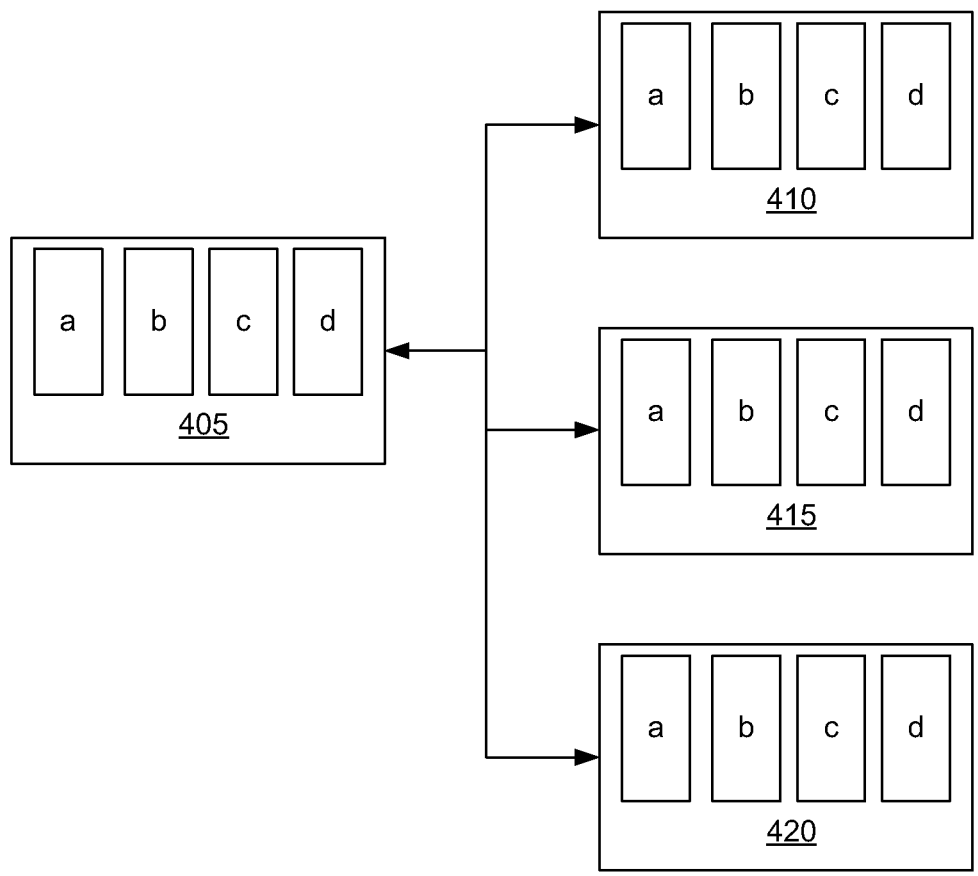
FIG. 4 is a diagram of an example of garbage collection in an in-memory replication system, according to one example of principles described herein.

FIG. 4 shows an example of garbage collection in the in-memory replication system (400) according to certain examples of the principles described herein, wherein the in-memory replication system (400) includes four node servers (405, 410, 415, 420), wherein a first node server (405) has data objects a, b, c and d; a second node server (410) has backup data objects a and c; a third node server (415) has backup data objects a, b and c; and a fourth node server (420) has backup data objects b, c and d. A data object identification table, shown in Table 1 below, is created in each of the node servers (405, 410, 415, 420) of the in-memory replication system (400), in which addresses of all the data objects in the various node servers (405, 410, 415, 420) of the in-memory replication system (400) are recorded.

TABLE 1

| Object | Node server 1 | Node server 2 | Node server 3 | Node server 4 |
|---|---|---|---|---|
| a | <1, x00a145c3> | <2, x0f890123> | <3, 0x04381029> | |
| b | <1, x052e159f> | | <3, 0x0a4bf916> | <4, 0x0428c4d2> |
| c | <1, x05122b38> | <2, 0x016b0c93> | | <4, 0x0284f231> |
| d | <1, x093257fe> | | <3, 0x0395da89> | <4, 0x09846d32> |

In response to garbage collection in the first node server (405) being triggered, the first node server (405) determines if identification information of the data objects that can be garbage-collected has been received from other node servers. In response to no such identification information having being received, the first node server (405) may collect data objects b and c by using the existing garbage collection mechanism, then searching the data object identification table for address information of the data objects b and c in the various node servers.

As shown in Table 2, the first node server (405) respectively transmits the address of the data object c to the second node server (410), transmits the address of the data object b to the third node server (415), and transmits the addresses of the objects b and c to the fourth node server (420). The second, third, and fourth node servers (405, 410, 415) store the identification information received from the first node server (405) regarding the data objects that can be garbage-collected. When garbage collection in the second, third, and fourth node servers (410, 415, 420) is triggered, these node servers (410, 415, 420) determine that identification information of data objects that can be garbage-collected have been received from the first node server (405) and directly release the memory space of the memory addresses of the data objects that can be garbage collected without performing the mark operation of garbage collection for those memory addresses. This saves computing resources and time overheads of the mark operation and improves efficiency of garbage collection in the in-memory replication system.

lection in node servers of an in-memory replication system according to certain examples. The system may include processing hardware of a specific node server that executes computer readable program code to implement various modules (505, 510, 515, 520, 525). These modules include a determination module (505) configured to, in response to garbage collection being triggered, determine whether identification information of data objects that can be garbage-collected has been received from one or more other node servers in the in-memory replication system; and a garbage collection assisting module (510) configured to, in response to identification information of data objects that can be garbage-collected having been received from at least one other node server, performs garbage collection on the data objects identified by the received identification information.

The system (500) also includes an identity information canceling module (515) configured to cancel the identification information of the garbage-collected data objects; a garbage collecting module (520) configured to perform traditional garbage collection on the data objects in the node servers of the in-memory replication system; and a communications module (525) configured to acquire the identification information of the data objects that can be garbage-collected in the process of garbage collection and transmit the identification information of the data objects that can be garbage-collected to other node servers that contain the data objects that can be garbage-collected.

The communications module (525) may be further configured to create a data object identification table, in which identification information of the data objects in the in-memory replication system in the various node servers is recorded, and to search the data object identification table for identification information of the data objects that can be garbage-collected in other node servers of the in-memory replication system.

According to certain examples, the identification information of the data objects that can be garbage-collected includes memory addresses of the data objects that can be garbage-collected in the node servers of the in-memory replication system. In the present example, the garbage collection assisting module (510) is further configured to release a memory space corresponding to the memory addresses of the data objects that can be garbage-collected in the node servers of the in-memory replication system.

TABLE 2

| Object | Node server 1 | Node server 2 | Node server 3 | Node server 4 |
|---|---|---|---|---|
| b | <1, x052e159f> | | <3, 0x0a4bf916> | <4, 0x0428c4d2> |
| c | <1, x05122b38> | <2, 0x016b0c93> | | <4, 0x0284f231> |

Figure 5:
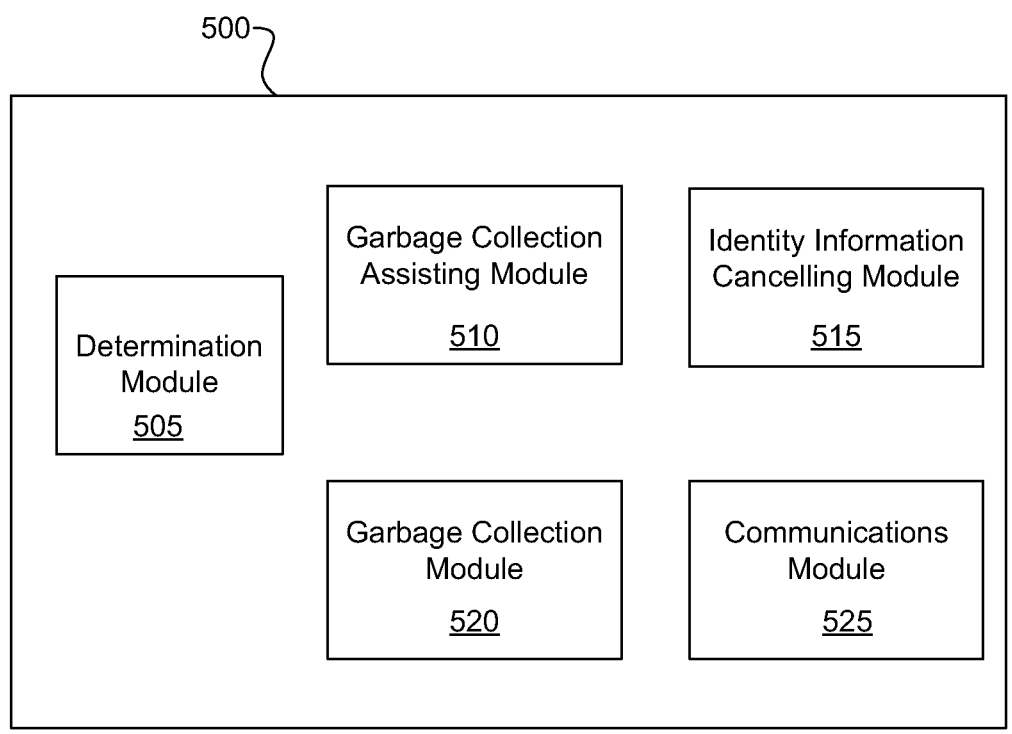
FIG. 5 is a block diagram of an illustrative system for garbage collection in an in-memory replication system, according to one example of principles described herein.

Based on the same inventive concept, the present specification further proposes a system for garbage collection in node servers of an in-memory replication system. FIG. 5 is a block diagram showing a system (500) for garbage col- According to another example, the identification information of the data objects that can be garbage-collected comprises global unique identification of the data objects that can be garbage-collected. In this case, the garbage collection assisting means is further configured to create a memory address mapping table, in which mapping relations between the global unique identification of the data objects contained in the node server and the memory addresses of the data objects are recorded, to search the memory address mapping table for the memory addresses of the data objects that can be garbage-collected corresponding to the global unique identification, and to release a memory space corresponding to the memory addresses of the data objects that can be garbage-collected in the node servers of the in-memory replication system.

The methods and systems of the present specification may operate in a Java run time environment or various computer platforms, frameworks and operating systems, e.g., .NET framework of C#. Therefore, although the methods and systems of the present specification are described in the scope of Java virtual machine (JVM), the JVMs described in the present specification may be replaced by or combined with any type of platform-independent program operating environments, including, but not limited to, C#, Smalltalk, Ruby, D language, Nuva, the like, and combinations thereof.

Having thus described the invention of the present application in detail and by reference to embodiments thereof, it will be apparent that modifications and variations are possible without departing from the scope of the invention defined in the appended claims.

What is claimed is:

1. A method of garbage collection in a first node server of an in-memory replication system, comprising:
   in response to a garbage collection trigger in said first node server, determining whether identification information for a replicated data object eligible for garbage collection in said first node server has been received by said first node server from at least a second node server in said in-memory replication system, wherein the identification information comprises an address to the replicated data object stored in the first node server and copied from a source data object saved in the second node server; and
   determining that said identification information has been received from at least said second node server and performing garbage collection on said data object with said first node server without a mark operation having been performed on the replicated data object in said first node server;
   determining that said identification information for data objects eligible for garbage collection has not been received from at least said second node server and identifying a data object stored by said first node server that is eligible for garbage collection with said first node server and performing garbage collection on said data object identified with said first node server; and
   acquiring identification information for said data object identified with said first node server and transmitting said identification information to at least one other node server in said in-memory replication system that stores said data object.

2. The method of claim 1, further comprising cancelling said identification information following said performance of garbage collection on said data objects with said first node server.

3. The method of claim 1, further comprising searching a data object identification table stored by said at least one other node server to determine whether said at least one other node server stores said data object.

4. The method of claim 1, in which said identification information comprises a memory address for said data object.

5. The method of claim 4, in which performing garbage collection on said data object comprises releasing a memory space in said first node server corresponding to said memory address for said data object.

6. The method of claim 1, in which said identification information comprises a globally unique identifier associated with said data object.

7. The method of claim 6, further comprising:
   storing a table in said first node server, said table mapping memory addresses of said first node server to globally unique identifiers of data objects stored by said first node server at said memory addresses.

8. A system for garbage collection in a first node server of an in-memory replication system, said system comprising:
   a processor; and
   at least one memory communicatively coupled to said processor, said memory comprising executable code that, when executed by said processor, causes said processor to:
      determine whether any external node server has indicated that a replicated data object stored by said at least one memory is eligible for garbage collection; and
      in response to determining that an external node server has indicated that the replicated data object stored by said at least one memory is eligible for garbage collection, performing garbage collection on said replicated data object without a mark operation having been performed on the replicated data object on the first node server.

9. The system of claim 8, said executable code causing said processor to erase identification information associated with said data object following said performance of garbage collection on said data objects with said first node server.

10. The system of claim 8, said executable code causing said processor to:
   acquire identification information for said data object identified with said first node server; and
   transmit said identification information to at least one other node server in said in-memory replication system that stores said data object.

11. The system of claim 10, said executable code causing said processor to search a data object identification table stored by said at least one other node server to determine whether said at least one other node server stores said data object.

12. The system of claim 8, in which said identification information comprises a memory address for said data object.

13. The system of claim 12, in which performing garbage collection on said data object comprises releasing a memory space in said first node server corresponding to said memory address for said data object.

14. The system of claim 8, in which said identification information comprises a globally unique identifier associated with said data object.

15. The system of claim 14, said executable code causing said processor to:
   store a table in said first node server, said table mapping memory addresses of said first node server to globally unique identifiers of data objects stored by said first node server at said memory addresses.

16. A computer program product for processing a query of a database, comprising:

a tangible computer-readable storage medium comprising computer-readable program code embodied therewith, the computer-readable program code comprising:
  computer-readable program code configured to, in response to a garbage collection trigger in said first node server, determine whether identification information for a replicated data object eligible for garbage collection in said first node server has been received by said first node server from at least a second node server in said in-memory replication system; and
  computer-readable program code configured to, determine that said identification information has been received from at least said second node server and performing garbage collection on said replicated data object with said first node server without a mark operation having been performed on the replicated data object in said first node server.

17. The computer program product of claim 16, said computer-readable program code further comprising:
  computer-readable program code configured to, determine that said identification information for data objects eligible for garbage collection has not been received from at least said second node server and identify data object stored by said first node server that is eligible for garbage collection with said first node server;
  computer-readable program code configured to perform garbage collection on said data object identified with said first node server;
  computer-readable program code configured to acquire identification information for said data object identified with said first node server; and
  computer-readable program code configured to transmit said identification information to at least one other node server in said in-memory replication system that stores
    said data object.

* * * * *